(No Model.)
J. W. JACKSON.
AXLE NUT.
No. 532,000. Patented Jan. 1, 1895.
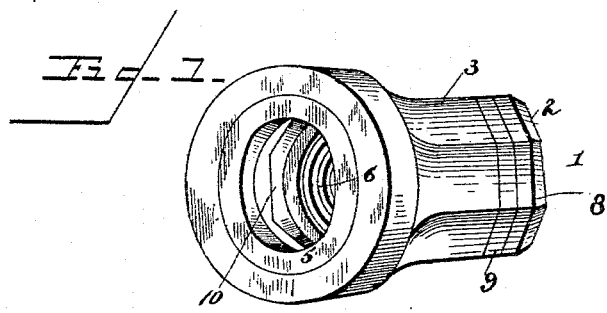
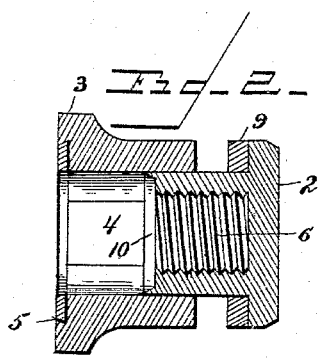 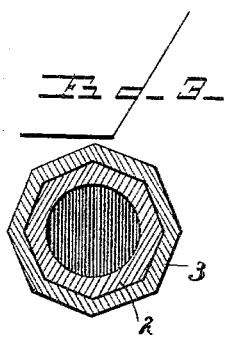
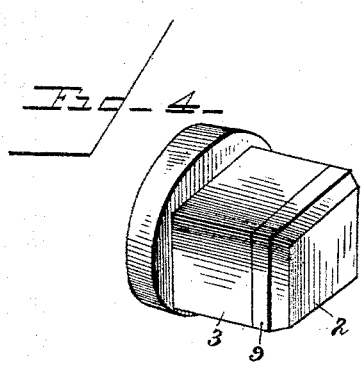 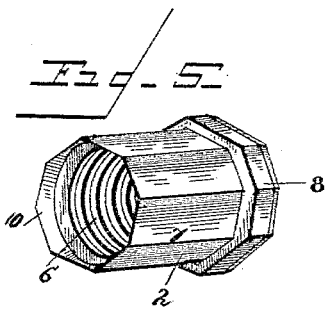
Inventor
John W. Jackson.
Witnesses
By his Attorneys,

United States Patent Office.

JOHN W. JACKSON, OF CAIRO, GEORGIA.

AXLE-NUT.

SPECIFICATION forming part of Letters Patent No. 532,000, dated January 1, 1895.

Application filed May 22, 1894. Serial No. 512,094. (No model.)

*To all whom it may concern:*

Be it known that I, JOHN W. JACKSON, a citizen of the United States, residing at Cairo, in the county of Thomas and State of Georgia, have invented a new and useful Axle-Nut, of which the following is a specification.

The invention relates to improvements in axle nuts.

The object of the present invention is to improve the construction of axle nuts, and to provide a simple and inexpensive one, capable of ready adjustment to take up wear and lost motion, to prevent vehicle wheels from wabbling.

The invention consists in the construction and novel combination and arrangement of parts, hereinafter fully described, illustrated in the accompanying drawings, and pointed out in the claims hereto appended.

In the drawings—Figure 1 is a perspective view of an axle nut constructed in accordance with this invention. Fig. 2 is a longitudinal sectional view, the inner section being partly drawn out. Fig. 3 is a transverse sectional view. Fig. 4 is a perspective view showing another form of nut. Fig. 5 is a detail perspective view of the inner section, showing the cutting edge thereof.

Like numerals of reference indicate corresponding parts in all the figures of the drawings.

1 designates a hexagonal axle nut composed of inner and outer sections 2 and 3, which are capable of longitudinal adjustment to lengthen the nut, take up wear, and lost motion, and to prevent a vehicle wheel from wabbling, and to enable the same to be tightened from time to time. The outer section, which conforms to the ordinary configuration of axle nuts, and presents a similar appearance, is provided with a polygonal opening 4 at its outer portion at the wrench seat, and its inner end is provided with an annular dovetail recess adapted to receive a beveled washer 5 to prevent an axle box from contacting with and wearing the nut.

The inner section 2 of the nut is provided with an interiorly threaded opening or bore 6, to screw on the threaded extremity of a spindle; and its outer surface is polygonal at 7 to conform to the configuration of the polygonal outer portion of the opening of the section 3 of the nut, whereby the sections are made telescoping and are adapted readily to lengthen the nut. The inner section is provided at its outer end with a head 8, and when the nut is lengthened washers 9 are interposed between the head 8 and the outer end of the outer section, to prevent the sections from telescoping and shortening the nut.

The inner section 2 terminates at its inner end in a shoulder to fit against that of the axle at the inner terminus of the threaded portion of the spindle, and the inner section is provided around the said shoulder with a tapering peripheral cutting edge or flange 10, the outer surface of which is flush with the polygonal face of the inner section, whereby the cutting edge is adapted to cut an opening to form a washer when it is desired to interpose one between the head 8, and the outer end of the outer section. This construction, it will be apparent, is highly advantageous, as the means are always present for making a washer to take up lost motion.

It will be seen that the nut is simple and comparatively inexpensive in construction, and that it is adapted to be readily adjusted to take up wear and lost motion. It will also be apparent that the improvements may be applied to any form or configuration of carriage nuts, such as that shown in Fig. 4 of the accompanying drawings; and I desire it to be understood that changes in the form, proportion, and the minor details of construction may be resorted to without departing from the principle or sacrificing any of the advantages of this invention.

What I claim is—

1. An axle nut comprising an outer section having a polygonal opening, an inner section having a threaded opening and provided at its outer end with a head, and having a polygonal outer surface between its inner end and the head, said polygonal surface conforming to the configuration of the polygonal opening of the outer section, and a series of washers arranged on the polygonal portion of the inner section and interposed between the head thereof and the outer end of the outer section, substantially as described.

2. An axle nut, comprising two telescoping inner and outer sections, the inner section being provided with a peripheral cutting edge adapted to cut a washer opening of a size to suit the sections, substantially as and for the purpose described.

3. An axle nut, comprising an outer section having a polygonal opening, and an inner section having a polygonal outer surface to conform to the configuration of the opening of the outer section and having a threaded opening, and provided at its outer end with a head and terminating at its inner end in a shoulder and provided thereat with a peripheral cutting edge, substantially as described.

In testimony that I claim the foregoing as my own I have hereto affixed my signature in the presence of two witnesses.

JOHN W. JACKSON.

Witnesses:
I. F. SPOONER,
W. C. BARROW.